(12) United States Patent
Moretti et al.

(10) Patent No.: US 6,603,020 B1
(45) Date of Patent: Aug. 5, 2003

(54) FLUORESCENT DIKETOPYRROLOPYRROLES

(75) Inventors: Robert Moretti, Petit-Lancy (CH); Zhimin Hao, Riehen (CH); Hiroshi Yamamoto, Takarazuka (JP)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/735,080

(22) Filed: Sep. 7, 2000

(30) Foreign Application Priority Data

Sep. 27, 1999 (EP) .............................. 99810867

(51) Int. Cl.⁷ ..................... C07D 209/86; C07D 487/02
(52) U.S. Cl. ..................... 548/453; 524/92; 548/443
(58) Field of Search ..................... 524/92; 548/453, 548/443

(56) References Cited

U.S. PATENT DOCUMENTS

| | | | |
|---|---|---|---|
| 4,666,455 A | 5/1987 | Jost et al. | 8/506 |
| 5,354,869 A | * 10/1994 | Langhals et al. | 548/453 |
| 5,973,146 A | 10/1999 | Rochat et al. | 544/144 |

FOREIGN PATENT DOCUMENTS

| | | |
|---|---|---|
| EP | 0 133 156 | 2/1985 |
| EP | 0 353 184 | 1/1990 |
| EP | 0 811 625 | 12/1997 |
| WO | 96/08537 | 3/1996 |
| WO | 98/25927 | 6/1998 |
| WO | 98/32802 | 7/1998 |
| WO | 98/33864 | 8/1998 |

* cited by examiner

*Primary Examiner*—Joseph K. McKane
*Assistant Examiner*—Sonya Wright
(74) *Attorney, Agent, or Firm*—David R. Crichton

(57) ABSTRACT

The present invention relates to fluorescent diketopyrrolopyrroles of formula I

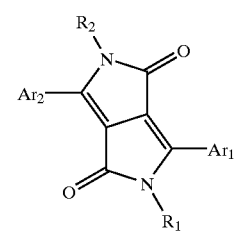

and processes for its preparation, its uses and compositions comprising the compounds of formula I.

5 Claims, No Drawings

FLUORESCENT DIKETOPYRROLOPYRROLES

The present invention relates to fluorescent diketopyrrolopyrroles ("DPPs") of the formula I

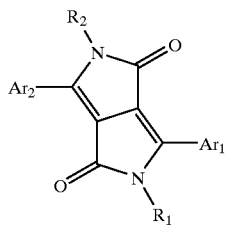

wherein $R_1$ and $R_2$, independently from each other, stand for $C_1$–$C_{25}$-alkyl, allyl which can be substituted one to three times with $C_1$–$C_3$alkyl or $Ar_3$, —$CR_3R_4$—$(CH_2)_m$—$Ar_3$, wherein $R_3$ and $R_4$ independently from each other stand for hydrogen or $C_1$–$C_4$alkyl, or phenyl which can be substituted on to three times with $C_1$–$C_3$ alkyl, $Ar_3$ stands for phenyl or 1- or 2-naphthyl which can be substituted one to three times with $C_1$–$C_8$alkyl, $C_1$–$C_8$alkoxy, halogen or phenyl, which can be substituted with $C_1$–$C_8$alkyl or $C_1$–$C_8$alkoxy one to three times, and m stands for 0, 1, 2, 3 or 4, and wherein $C_1$–$C_{25}$-alkyl or —$CR_3R_4$—$(CH_2)_m$—$Ar_3$, preferably $C_1$–$C_{25}$-alkyl, can be substituted with a functional group capable of increasing the solubility in water such as a tertiary amino group, —$SO_3$—, or $PO_4^{2-}$, $Ar_1$ and $Ar_2$, independently from each other, stand for

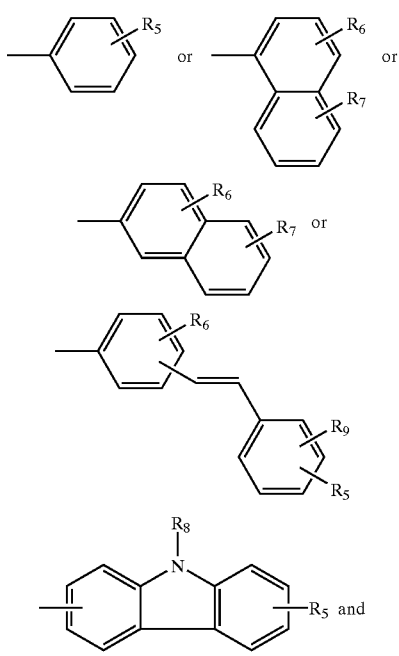

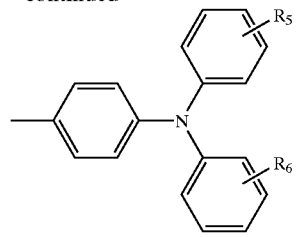

wherein
$R_5$ stands for $C_1$–$C_6$alkyl, —$NR_8R_9$, —$OR_{10}$, —$S(O)_nR_8$, —$Se(O)_nR_8$, or phenyl, which can be substituted one to three times with $C_1$–$C_8$alkyl or $C_1$–$C_8$alkoxy, wherein $R_8$ and $R_9$, independently from each other, stand for hydrogen, $C_1$–$C_{25}$-alkyl, $C_5$–$C_{12}$-cycloalkyl, —$CR_3R_4$—$(CH_2)_m$—Ph, $R_{10}$, wherein $R_{10}$ stands for $C_6$–$C_{24}$-aryl, or a saturated or unsaturated heterocyclic radical comprising five to seven ring atoms, wherein the ring consists of carbon atoms and one to three hetero atoms selected from the group consisting of nitrogen, oxygen and sulfur, wherein Ph, the aryl and heterocyclic radical can be substituted one to three times with $C_1$–$C_8$alkyl, $C_1$–$C_8$alkoxy, or halogen, or $R_8$ and $R_9$ stand for —$C(O)R_{10}$, wherein $R_{11}$ can be $C_1$–$C_{25}$-alkyl, $C_5$–$C_{12}$-cycloalkyl, $R_{10}$, —$OR_{12}$ or —$NR_{13}R_{14}$, wherein $R_{12}$, $R_{13}$, and $R_{14}$ stand for $C_1$–$C_{25}$-alkyl, $C_5$–$C_{12}$-cycloalkyl, $C_6$–$C_{24}$-aryl, or a saturated or unsaturated heterocyclic radical comprising five to seven ring atoms, wherein the ring consists of carbon atoms and one to three hetero atoms selected from the group consisting of nitrogen, oxygen and sulfur, wherein the aryl and heterocyclic radical can be substituted one to three times with $C_1$–$C_8$alkyl or $C_1$–$C_8$alkoxy, or —$NR_8R_9$ stands for a five- or sixmembered heterocyclic radical in which $R_8$ and $R_9$ together stand for tetramethylene, pentamethylehe, —$CH_2$—$CH_2$—O—$CH_2$—$CH_2$—, or —$CH_2$—$CH_2$—$NR_5$—$CH_2$—$CH_2$—, preferably —$CH_2$—$CH_2$—O—$CH_2$—$CH_2$—, and n stands for 0, 1, 2 or 3, and wherein $R_6$ and $R_7$, independently from each other, stand for hydrogen or $R_5$, but do not stand simultaneously for hydrogen, preferably $R_6$ stands for $R_5$ and $R_7$ for hydrogen.

U.S. Pat. No. 4,579,949 describes a process for the preparation of DPPs which are unsubstituted at the nitrogen atoms of the pyrrolo-rings. Especially example 45 describes the DPP-compound of the formula II

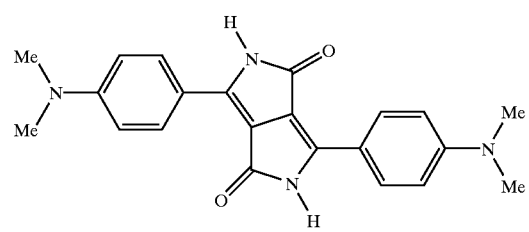

DPP-compound II, however, is violet, exhibits only insufficient fluorescence and solubility.

Further, EP-A 133,156 claims generically DPP-compounds, however, compounds of formula I are not mentioned explicitly and no teaching is given that DPP-compounds of formula I could exhibit a red or orange fluorescence.

EP-A 499,011 describes electroluminescent devices comprising DPP-compounds. Particularly, in example 1 the DPP-derivative of formula III

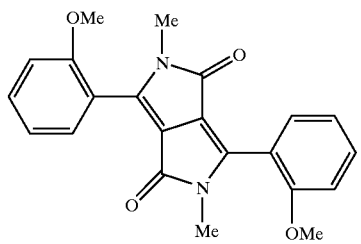

is disclosed. However, no teaching is given with regard to the fluorescence of DPP-compounds and a way to obtain DPP-compounds exhibiting a red or orange fluorescence.

WO 98/33862 describes the use of the DPP-compound of formula IV

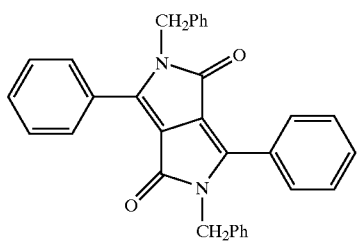

as a guest molecule in electroluminescent devices. However, no teaching is given with regard to the fluorescence of DPP-compounds and a way to obtain DPP-compounds exhibiting a red or orange fluorescence.

In addition, commercially available red fluorescent dyes such as thioindigo derivatives do not show superior light stability when incorporated in plastics. In addition, commercially available red fluorescent dyes cannot be applied to colour polyamides, because they decompose during the manufacturing process.

Hence, the object of this invention was to provide red or orange fluorescent compounds with a high heat stability, a good solubility in polymers, hydrocarbon based fuels, lubricants, and water, a high light stability, and the ability to be used in plastics, especially polyamides, without decomposition and loss of lightfastness, and in paints.

Accordingly, the abovementioned DPP-compounds I were found.

In addition, a process for its preparation and its use were found, too.

Red or orange fluorescent compounds means that the inventive compounds preferably have a fluorescence emission maximum in the range of from 520 to 780, more preferably from 550 to 700, more preferred from 580 to 650 nm. Further, the inventive compounds preferably exhibit an absorption in the range of 480 to 580 nm.

The inventive compounds I usually exhibit a fluorescence quantum yield ("FQY") in the range of from $1>FQY\geq0.3$ (measured in aerated toluene or DMF). Further, in general, the inventive compounds I exhibit a molar absorption coefficient in the range of from 5000 to 100000.

A preferred embodiment relates to DPP-compounds I, wherein $R_1=R_2$, and $R_5=R_6$, $R_7$=hydrogen, and $Ar_1=Ar_2$, particularly preferred wherein in addition to the above $R_3=R_4=H$, m=0 and n=0, most preferred are DPP-compounds in which (a) $R_1=R_2=C_1-C_8$alkyl, $Ar_1=Ar_2$=phenyl or stilbene, $R_5=R_6$=—$NR_7R_8$ in 4-position, $R_7$=hydrogen, and $R_8=R_9=C_1-C_8$alkyl or phenyl, or (b) $R_1=R_2=C_1-C_8$alkyl, —$(CH_2)_m$—Ph, $Ar_1=Ar_2$=phenyl or stilbene, $R_5=R_6$=—$SR_7$ or unsubstituted or substituted phenyl in para-position, and $R_8=C_1-C_8$alkyl, phenyl or a heterocyclic radical, both unsubstituted or substituted, or $C_5-C_{12}$-cycloalkyl, or (c) $R_1=R_2$=—$CH_2$—Ph, wherein phenyl can be substituted with phenyl, naphthyl or $C_1-C_4$alkyl up to two times, $Ar_1=Ar_2$=phenyl or 1- or 2-naphthyl, $R_5=R_6=R_7$=hydrogen, in case where $Ar_1=Ar_2$=1- or 2-naphthyl, or, in all other cases, $C_1-C_8$alkyl or phenyl.

Particularly preferred DPP-compounds I are the following compounds:

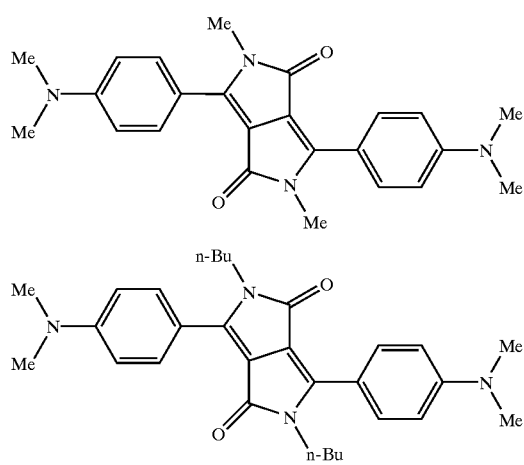

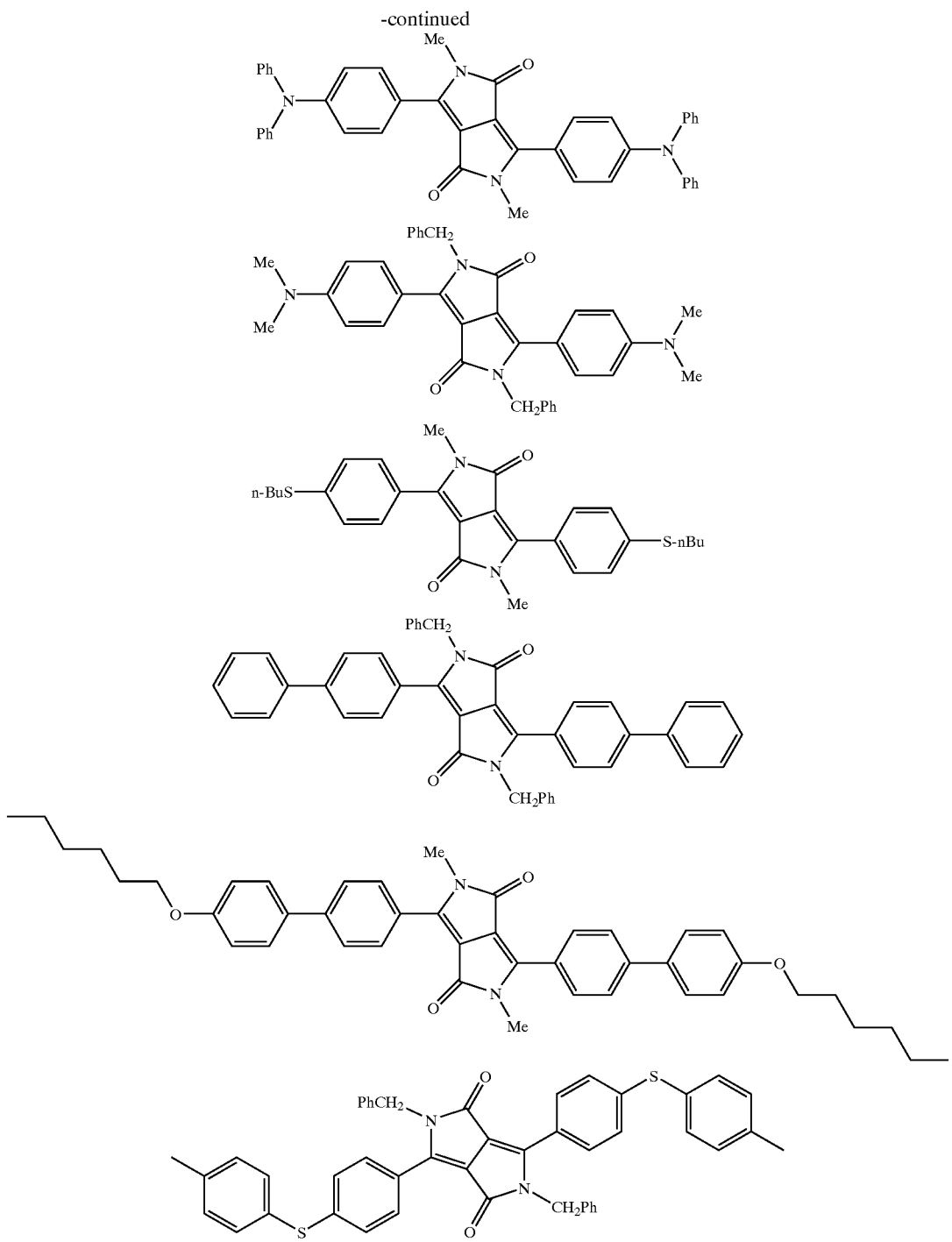

C₁–C₂₅alkyl is typically linear or branched—where possible—methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl, n-heptyl, n-octyl, 1,1,3,3-tetramethylbutyl and 2-ethylhexyl, n-nonyl, decyl, undecyl, dodecyl, tetradecyl, pentadecyl, hexadecyl, heptadecyl, octadecyl, eicosyl, heneicosyl, docosyl, tetracosyl or pentacosyl, preferably C₁–C₈alkyl such as methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl, more preferably C₁–C₄alkyl such as typically methyl, ethyl, n-propyl, isopropyl, n-butyl, sec.-butyl, isobutyl, tert.-butyl; C₁–C₃alkyl stands for methyl, ethyl, n-propyl, or isopropyl; C₁–C₆alkyl stands for methyl, ethyl, n-propyl, isopropyl, n-butyl, sec.-butyl, isobutyl, tert.-butyl, n-pentyl, 2-pentyl, 3-pentyl, 2,2-dimethyl-propyl, or n-hexyl.

C₁–C₈alkoxy is typically methoxy, ethoxy, n-propoxy, isopropoxy, n-butoxy, sec.-butoxy, isobutoxy, tert.-butoxy, n-pentoxy, 2-pentoxy, 3-pentoxy, 2,2-dimethylpropoxy, n-hexoxy, n-heptoxy, n-octoxy, 1,1,3,3-tetramethylbutoxy and 2-ethylhexoxy, preferably C₁–C₄alkoxy such as typically methoxy, ethoxy, n-propoxy, isopropoxy, n-butoxy, sec.-butoxy, isobutoxy, tert.-butoxy.

$C_6$–$C_{24}$aryl is typically phenyl, 1-naphthyl, 2-naphthyl, 4-biphenyl, phenanthryl, 2- or 9-fluorenyl or anthracenyl, preferably $C_6$–$C_{12}$aryl such as phenyl, 1-naphthyl, 2-naphthyl, 4-biphenyl.

$C_7$–$C_{24}$aralkyl is typically benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl, ω-phenyl-octadecyl, ω-phenyl-eicosyl or ω-phenyl-docosyl, preferably $C_7$–$C_{18}$aralkyl such as benzyl, 2-benzyl-2-propyl, β-phenyl-ethyl, α,α-dimethylbenzyl, ω-phenyl-butyl, ω,ω-dimethyl-ω-phenyl-butyl, ω-phenyl-dodecyl or ω-phenyl-octadecyl, and particularly preferred $C_7$–$C_{12}$aralkyl such as benzyl, 2-benzyl-2-propyl, β-phenyl-ethyl, α,α-dimethylbenzyl, ω-phenyl-butyl, or ω,ω-dimethyl-ω-phenyl-butyl.

$C_5$–$C_{12}$cycloalkyl is typically cyclopentyl, cyclohexyl, cycloheptyl, cyclooctyl, cyclononyl, cyclodecyl, cycloundecyl, cyclododecyl, preferably cyclopentyl, cyclohexyl, cycloheptyl, cyclooctyl.

Heteroaryl with five to seven ring atoms, wherein nitrogen, oxygen or sulfur are the possible hetero atoms, is typically an unsaturated heterocyclic radical with five to 18 atoms having at least six conjugated π-electrons such as thienyl, benzo[b]thienyl, dibenzo[b,d]thienyl, thianthrenyl, furyl, furfuryl, 2H-pyranyl, benzofuranyl, isobenzofuranyl, dibenzofuranyl, phenoxythienyl, pyrrolyl, imidazolyl, pyrazolyl, pyridyl, bipyridyl, triazinyl, pyrimidinyl, pyrazinyl, pyridazinyl, indolizinyl, isoindolyl, indolyl, indazolyl, purinyl, quinolizinyl, chinolyl, isochinolyl, phthalazinyl, naphthyridinyl, chinoxalinyl, chinazolinyl, cinnolinyl, pteridinyl, carbazolyl, carbolinyl, benzotriazolyl, benzoxazolyl, phenanthridinyl, acridinyl, perimidinyl, phenanthrolinyl, phenazinyl, isothiazolyl, phenothiazinyl, isoxazolyl, furazanyl or phenoxazinyl, preferably the above-mentioned mono- or bicyclic heterocyclic radicals.

The inventive DPP-compounds I can be synthesized according to methods well known in the art such as described in EP-A 133,156, e.g. in analogy to example 15.

A preferred embodiment of this invention relates to a process for the preparation of the inventive compounds I by treating in a first step the DPP derivative of formula V

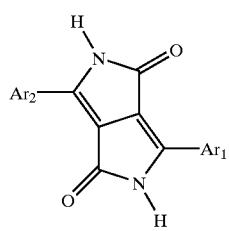

V with a base, then, in a second step, treating the reaction mixture obtained in the first step with a usual alkylating agent, wherein in the first step the base is a hydride, an alkali metal alkoxide or a carbonate, and the alkylating agent is a sulfonate, tosylate, mesylate, carbonate, sulfate, or halogen compound of the formula $(R_1)_{1\ or\ 2}X$, wherein X stands for $SO_3$—, (p-Me-phenyl)$SO_2$—, (2,4,6-trimethyl-phenyl)$SO_2$—, —$CO_3$—, —$SO_4$—, or halogen such as chlorine, bromine or iodine, preferably chlorine, bromine or iodine, particularly preferred for bromine or iodine, or a mixture of $(R_1)_{1\ or\ 2}X$ and $(R_2)_{1\ or\ 2}X$.

As a hydride usually an alkali metal hydride such as sodium hydride, lithium hydride, or potassium hydride, as an alkali metal alkoxide in general an alkali metal $C_1$–$C_4$alkoxide such as sodium or potassium tert. butoxide, sodium tert.-amylate, and as a carbonate usually sodium or potassium carbonate can be used, preferably sodium hydride.

Usually, the first step of the preferred preparation of compound I starting from compound V is carried out at a temperature in the range of from −25 to 100, preferably from 0 to 25° C. Preferably, the reaction is carried out in the presence of a solvent, preferably a dipolar aprotic solvent such as carboxamides, lactams, urea derivatives, sulfones and nitrobenzene such as dimethyl formamide ("DMF"), dimethyl acetamide ("DMA"), N-methylpyrrolidone ("NMP"), N,N'-dimethylethylene urea and N,N'-dimethylpropylene urea.

In case a solvent is used, a weight ratio of solvent to DPP-compound is chosen in the range of from 100:1 to 5:1, preferably from 25:1 to 10:1.

In addition, it is preferred to carry out the first step in the presence of a phase transfer catalyst such as a tetra alkyl ammonium halide such as tetraethyl ammonium bromide.

Usually, a molar ratio of base to DPP-compound V is chosen in the range of from 10:1 to 2:1, preferably from 4:1 to 2:1.

Preferably, a molar ratio of DPP-compound V to the phase transfer catalyst is chosen in the range of from 100:1 to 5:1, preferably from 25:1 to 10:1.

Generally, the reaction time depends inter alia on the reactivity of the chosen reactants and the chosen temperature. As an example, if room temperature is chosen as reaction temperature, a reaction time is as a rule in the range of from 0.5 to 24 hours.

Preferably, the halogen compound $R_1$—X (or the aforementioned mixture) is added to the reaction mixture obtained in the first step in the same solvent used in the first step.

The reaction temperature in the second process step usually is chosen in the range of from 0 to 160, preferably from 25 to 110° C., depending on inter alia the desired reaction pressure and solvent used.

The reaction time generally is chosen in the range of from 0.5 to 120, preferably from 12 to 60 hours.

As a rule the molar ratio of $R_1$—X to DPP compound V is chosen in the range of from 10:1 to 2:1, preferably from 4:1 to 2:1.

In case a solvent is used, the amount of solvent usually is chosen in the range of from 100:1 to 5:1, preferably from 25:1 to 10:1, based on the amount of halogen compound $R_1$—X. Further, preferably the same solvent is used as in the first step, if a solvent is used in the first step. If no solvent is used in the first step, the same solvents can be used as mentioned above.

The obtained reaction mixture can be worked up by applying methods well known in the art, e.g. by precipitating the product in the presence of an appropriate solvent such as water, and, if deemed necessary, by re-crystallization in an appropriate solvent such as ethanol.

Other methods for example are the addition of an alcohol to quench the excess base followed by filtration.

Compounds V are described e.g. in U.S. Pat. No. 4,579,949, and/or can be prepared according to the method described therein, in which an appropriate nitrile is reacted with a corresponding dialkyl or diaryl succinate, e.g. NC—$Ar_1$ is reacted with sodium tert.-amyl alcohol followed by the addition of diisopropyl succinate. This method is preferred in case $Ar_1$ and/or $Ar_2$ stand for a biphenyl radical (i.e. $R_5$ and/or $R_6$ stand for phenyl or substituted phenyl in 4-position), or for the compounds described below (DPP VI).

Compounds I are also available in analogy to the method described in EP-A 353,184, which comprises reacting a DPP-compound of formula VI

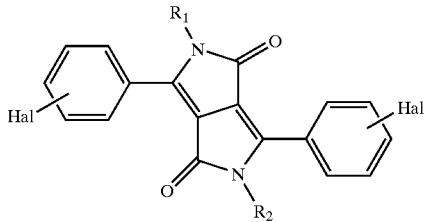

VI wherein Hal stands for halogen such as fluorine, chlorine, bromine or iodine, preferably chlorine or bromine, with a nucleophilic agent such as a secondary amine, $HNR_8R_9$, a thiol, $HSR_8$, or $HS(O)_nR_8$, an alcohol, $HOR_{10}$, a diselenide, $R_8(O)_nSe—Se(O)_nR_8$, preferably in a molar ratio of DPP VI:nucleophilic agent in the range of 1.2:1 to 0.8:1, or, if $R_2$ has the same meaning as $R_1$ in the range of from 1:2.5 to 1:1, in the presence of an anhydrous dipolar aprotic solvent, and of an anhydrous base in an amount in the range of from usually 0.1 to 15 moles per mole of the nucleophilic agent, at a temperature in the range of from usually 100 to 220° C. and under a pressure generally in the range of from 100 to 300 kPa.

Examples of suitable anhydrous dipolar aprotic solvents are carboxamides, lactams, urea derivatives, sulfones and nitrobenzene such as DMF, DMA, NMP, N,N'-dimethylethylene urea and N,N'-dimethylpropylene urea.

Suitable anhydrous bases are e.g. anhydrous organic bases such as quinoline, or preferably, an excess of the secondary amine used for the amination, the aforementioned carbonates such as sodium or potassium carbonate and alkali metal hydrides such as sodium hydride. In case a diselenide, $R_7(O)_nSe—Se(O)_nR_7$, is used, an alkali metal hydride, preferably sodium hydride, has to be used as a base.

The corresponding 1- and 2-naphthyl-derivatives can be prepared analogously.

DPP-compounds VI are known and/or can be prepared e.g. according to the method described in U.S. Pat. No. 4,579,949, which methods comprises reacting a dialkyl or diaryl succinate with a nitrile, e.g. dimethyl succinate can be reacted with p-chloro benzonitrile according to example 6 in U.S. Pat. No. 4,579,949 to yield the corresponding DPP compound VI, in which Hal stands for chlorine.

Compounds $R_1$—X are commercially available or can be prepared by methods well known in the art.

A further embodiment of the invention on hand concerns a process for the preparation of the inventive compounds I (a) in treating in a first step the DPP derivative of formula VI with a nucleophilic agent such as a secondary amine, $HNR_8R_9$, a thiol, $HSR_8$, or $HS(O)_nR_8$, an alcohol, $HOR_{10}$, a diselenide, $R_8(O)_nSe—Se(O)_nR_8$, preferably in a molar ratio of DPP VI:nucleophilic agent in the range of 1.2:1 to 0.8:1, or, if $R_2$ has the same meaning as $R_1$ in the range of from 1:2.5 to 1:1, in the presence of an anhydrous dipolar aprotic solvent, and of an anhydrous base in an amount in the range of from usually 0.1 to 15 moles per mole of the nucleophilic agent, at a temperature in the range of from usually 100 to 220° C. and under a pressure generally in the range of from 100 to 300 kPa, and optionally isolating the obtained compound V, (b) then treating the obtained compound V, with a base, thereafter in a second step, treating the reaction mixture obtained in the first step of (b) with an usual alkylating agent, wherein in the first step of (b) the base is a hydride, an alkali metal alkoxide or a carbonate, and the alkylating agent is a sulfonate, tosylate, mesylate, carbonate, sulfate, or halogen compound of the formula $(R_1)_{1\ or\ 2}X$, wherein X stands for $SO_3$—, (p-Me-phenyl)$SO_2$—, (2,4,6-trimethyl-phenyl)$SO_2$—, —$CO_3$—, —$SO_4$—, or halogen, or a mixture of $(R_1)_{1\ or\ 2}X$ and $(R_2)_{1\ or\ 2}X$ (it is evident, that the number of $R_1$-units (either one or two) in $(R_1)_{1\ or\ 2}X$ depends on the nature of the chosen rest X, i.e. there can be only two $R_1$-units if X stands for a divalent anion such as —$CO_3$—, —$SO_4$— etc.).

Water-soluble compounds I, i.e. inventive compounds I being substituted with a functional group capable of increasing the solubility in water such as a tertiary amino group, $SO_3$—, or $PO_4^{2-}$, can be prepared by using well-known methods in the art. The following routes are representative examples, and, hence, do not restrict the invention just to these examples:

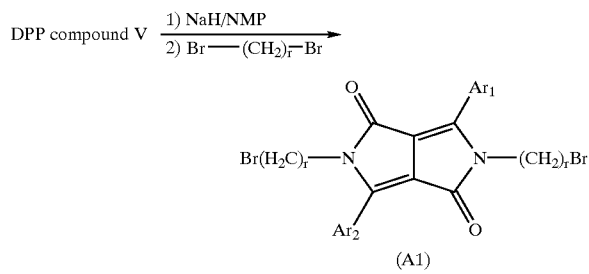

wherein r stands for an integer from usually 2 to 25; instead of linear alkyl groups, one could also use branched alkyl groups or aralkyl groups such as Br—$(CH_2)_{r1}$aryl-$(CH_2)_{r2}$—Br, $r_1$ and $r_2$ usually being whole numbers in the range of from 0 to 10;

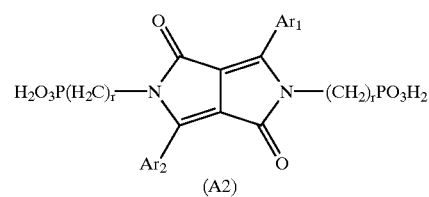

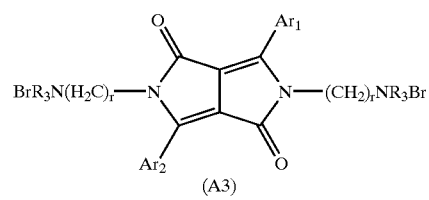

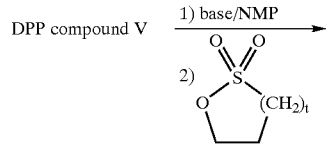

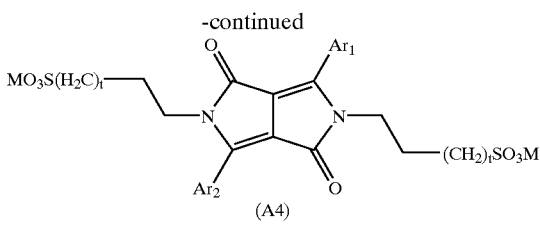

(A4)

wherein M stands for a metal ion such as sodium or potassium, and t is 1 or 2.

Another embodiment of the present invention is related to a method of coloring high molecular weight organic materials (having a molecular weight usually in the range of from $10^3$ to $10^7$ g/mol) by incorporating the inventive fluorescent DPP compounds I by known methods in the art.

As high molecular weight organic materials the following can be used such as biopolymers, and plastic materials, including fibres.

The present invention relates preferably to the use of the inventive DPPs I for the preparation of inks, for printing inks in printing processes, for flexographic printing, screen printing, packaging printing, security ink printing, intaglio printing or offset printing, for pre-press stages and for textile printing, for office, home applications or graphics applications, such as for paper goods, for example, for ballpoint pens, felt tips, fiber tips, card, wood, (wood) stains, metal, inking pads or inks for impact printing processes (with impact-pressure ink ribbons), for the preparation of colorants, for coating materials, for industrial or commercial use, for textile decoration and industrial marking, for roller coatings or powder coatings or for automotive finishes, for high-solids (low-solvent), water-containing or metallic coating materials or for pigmented formulations for aqueous paints, for the preparation of pigmented plastics for coatings, fibers, platters or mold carriers, for the preparation of non-impact-printing material for digital printing, for the thermal wax transfer printing process, the ink jet printing process or for the thermal transfer printing process, and also for the preparation of color filters, especially for visible light in the range from 400 to 700 nm, for liquid-crystal displays (LCDs) or charge combined devices (CCDs) or for the preparation of cosmetics or for the preparation of polymeric ink particles, toners, dye lasers, dry copy toners liquid copy toners, or electrophotographic toners, and electroluminescent devices.

Illustrative examples of suitable organic materials of high molecular weight which can be colored with the inventive fluorescent DPPs I of this invention are vinyl polymers, for example polystyrene, poly-α-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert.-butylphenol, o-, m- or p-nonylphenol, p-chlorophenol or p-phenylphenol, or a compound having more than one phenolic group such as resorcinol, bis(4-hydroxyphenyl)methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, poly-ester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic materials may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the inventive fluorescent DPPs I are used for the mass coloration of polyvinyl chloride, polyamides and, especially, polyolefins such as polyethylene and polypropylene as well as for the preparation of paint systems, including powder coatings, inks, printing inks, color filters and coating colors. Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the inventive fluorescent DPPs I can be added in any desired amount to the material to be colored, depending on the end use requirements. In the case of high molecular weight organic materials, for example, the fluorescent DPPs I prepared according to this invention can be used in an amount in the range from 0.01 to 40, preferably from 0.01 to 5% by weight, based on the total weight of the colored high molecular weight organic material.

Hence, another embodiment of the present invention relates to a composition comprising
(a) 0.01 to 50, preferably 0.01 to 5, particularly preferred 0.01 to 2% by weight, based on the total weight of the colored high molecular organic material, of a fluorescent DPP I according to the present invention, and
(b) 99.99 to 50, preferably 99.99 to 95, particularly preferred 99.99 to 98% by weight, based on the total weight of the colored high molecular organic material, of a high molecular organic material, and
(c) if desired, customary additives such as rheology improvers, dispersants, fillers, paint auxiliaries, siccatives, plasticizers, UV-stabilizers, and/or additional pigments or corresponding precursors in effective amounts, such as e.g. from 0 to 50% by weight, based on the total weight of (a) and (b).

To produce non-brittle mouldings or to diminish their brittleness, so-called plasticizers can be added to the high molecular weight organic materials prior to moulding. Plasticizers may be, for example, esters of phosphoric acid, phthalic acid and sebacic acid. Said plasticizers may be added before, during or after pigmenting the high molecular weight organic materials with the inventive fluorescent DPPs I.

To obtain different shades, the inventive fluorescent DPPs I may advantageously be used in admixture with fillers, transparent and opaque white, colored and/or black pigments as well as customary luster pigments in the desired amount.

For the preparation of paints systems, coating materials, color filters, inks and printing inks, the corresponding high molecular weight organic materials, such as binders, synthetic resin dispersions etc. and the inventive fluorescent DPPs I are usually dispersed or dissolved together, if desired together with customary additives such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together at once.

Hence, a further embodiment of the present invention relates to a method of using the inventive fluorescent DPPs I for the preparation of dispersions and the corresponding dispersions, and paint systems, coating materials, color filters, inks and printing inks comprising the inventive fluorescent DPPs I.

A particularly preferred embodiment relates to the use of the inventive DPPs I for the preparation of fluorescent tracers for e.g. leak detection of fluids such as lubricants, cooling systems etc., as well as to fluorescent tracers or lubricants comprising the inventive DPPs I. Usually, such lubricant compositions, e.g. for a refrigerant, comprise an oil selected from the group consisting of naphthalenic oils, paraffinic oils, alkylated benzene oils, polyalkyl silicate oils, polyglycols, esters, polyether polyols, polyvinyl ethers, polycarbonates, fluorinated silicones, perfluoroethers, aromatic compounds with fluoroalkyloxy or fluoroalkylthio substituents. The amount of the inventive DPP I in the lubricant is chosen generally in an amount of from 100 to 1000 ppm. If the inventive compound I is water-soluble, it could be used as tracer in water as well.

A particular embodiment of this invention concerns ink jet inks comprising the inventive fluorescent compositions.

The desired ink may contain up to 30% by weight of the fluorescent composition, but will generally be in the range of 0.1 to 10, preferably from 0.1 to 8% by weight of the total ink composition for most thermal ink jet printing applications.

Further, the inks usually contain polymeric dispersants such as random, block, branched or graft polymers or copolymers. Most preferred are polymeric dispersants made by the group transfer polymerization process, because in general these are free from higher molecular weight species that tend to plug pen nozzles.

In AB or BAB block copolymers, the A segment usually is a hydrophobic homopolymer or copolymer which serves to link with the inventive fluorescent composition and the B block generally is a hydrophilic homopolymer or copolymer, or salts thereof and serves to disperse the pigment in the preferably chosen aqueous medium. Such polymeric dispersants and the synthesis thereof are known from e.g. U.S. Pat No. 5,085,698.

ABC triblocks are also useful as dispersants. In the ABC triblock, the A block usually is a polymer compatible with water, the B block is a polymer capable of binding to the fluorescent composition and the C block is compatible with the organic solvent. Preferably the A and C blocks are end blocks. ABC triblocks and their synthesis are disclosed e.g. in EP-A 556,649. Suitable graft polymers are disclosed in U.S. Pat. No. 5,231,131.

Representative compounds useful for this purpose include e.g. polymers of polyvinyl alcohol, cellulosics and ethylene oxide modified polymers, and dispersant compounds containing ionisable groups such as acrylic acid, maleic acid or sulfonic acid.

The polymeric dispersant is generally present in an amount in the range of from 0.1 to 30, preferably from 0,1 to 8% by weight of the total ink composition.

In addition to, or in place of the preferred polymeric dispersants, surfactants may be used as dispersants. These may be anionic, nonionic, or amphoteric surfactants. A detailed list of non-polymeric as well as some polymeric dispersants is disclosed in the section on dispersants of Manufacturing Confection Publishing Co., (1990) p. 110–129, McCutcheon's Functional Materials, North America Edition.

Usually the ink contains an aqueous medium such as water or a mixture of water and at least one water-soluble organic solvent. Water-soluble organic solvents are well known, representative examples of which are disclosed in e.g. U.S. Pat. No. 5,085,698. Selection of a suitable mixture of water and water-soluble organic solvent depends on usually requirements of the specific application such as desired surface tension and viscosity, drying time of the ink, and the media substrate onto which the ink will be printed.

Particularly preferred is a mixture of a water-soluble solvent having at least two hydroxyl groups, e.g. diethylene glycol, and water, especially deionized water.

In the event that a mixture of water and a water-soluble organic solvent is used as aqueous medium, water usually would comprise from 30 to 95, preferably 60 to 95% by weight, based on the total weight of the aqueous medium.

The amount of aqueous medium generally is in the range of from 70 to 99.8, preferably from 84 to 99.8%, based on the total weight of the ink.

The ink may contain other ingredients well known to those skilled in the art such as surfactants to alter surface tension as well as to maximize penetration. However, because surfactants may destabilize dispersions, care should be taken to insure compatibility of the surfactant with the other ink components. In general, in aqueous inks, the surfactants may be present in amounts ranging from 0.01 to 5, preferably from 0.2 to 3% by weight, based on the total weight of the ink.

Biocides may be used in the ink compositions to inhibit growth of microorganisms. Sequestering agents such as EDTA may also be included to eliminate deleterious effects of heavy metal impurities. Other known additives, such as viscosity modifiers may also be added.

A further embodiment concerns the use of the inventive fluorescent compounds I in phase change ink jet inks. The preparation of such inks is well known in the art, e.g. described in detail in EP-A 816, 410.

For the pigmentation of high molecular weight organic material, the inventive DPPs I, optionally in the form of masterbatches, usually are mixed with the high molecular weight organic materials using roll mills, mixing apparatus or grinding apparatus. Generally, the pigmented material is subsequently brought into the desired final form by conventional processes, such as calandering, compression molding, extrusion, spreading, casting or injection molding. In order to prepare non-rigid moldings or to reduce their brittleness it is often desired to incorporate so-called plasticizers into the high molecular weight organic materials prior to forming. Examples of compounds which can be used as such plasticizers are esters of phosphoric acid, phthalic acid or sebacic acid. The plasticizers can be added before or after the incorporation of the inventive DPPs I into the polymers. It is also possible, in order to achieve different hues, to add fillers or other coloring constituents such as white, color or black pigments in desired amounts to the high molecular weight organic materials in addition to the inventive DPPs I.

For pigmenting lacquers, coating materials and printing inks the high molecular weight organic materials and the inventive DPPs I, alone or together with additives, such as fillers, other pigments, siccatives or plasticizers, are generally dissolved or dispersed in a common organic solvent or solvent mixture. In this case it is possible to adopt a procedure whereby the individual components are dispersed or dissolved individually or else two or more are dispersed or dissolved together and only then are all of the components combined.

The present invention additionally relates to inks comprising a coloristically effective amount of the pigment dispersion of the inventive DPPs I.

Processes for producing inks especially for ink jet printing are generally known and are described for example in U.S. Pat. No. 5,106,412.

The inks can be prepared, for example, by mixing the pigment dispersions comprising the inventive DPPs I with polymeric dispersants.

The mixing of the pigment dispersions with the polymeric dispersant takes place preferably in accordance with generally known methods of mixing, such as stirring or mechanical mixing; it is preferably advisable to use intensive mechanical mixers such as the so-called ULTRATURAX® stirrer from Kunkel & Jahn, Staufen (Germany).

When mixing a DPP I with polymeric dispersants it is preferred to use a water-dilutable organic solvent.

The weight ratio of the pigment dispersion to the ink in general is chosen in the range of from 0.001 to 75% by weight, preferably from 0.01 to 50% by weight, based on the overall weight of the ink.

Examples of suitable polymeric dispersants are carboxyl-containing polyacrylic resins such as polymeric methacrylic or crotonic acids, especially those obtained by addition polymerization of acrylic acid or acrylic acid and other acrylic monomers such as acrylates. Depending on the field of use or when using DPP I, it is also possible, if desired, to admix a small proportion of a water-miscible organic solvent in from 0.01 to 30% by weight, based on the overall weight of the ink, and/or to admix water and/or bases so as to give a pH in the range from 7 to 11. It may likewise be advantageous to add preservatives, antifoams, surfactants, light stabilizers and pH regulators, for example, to the ink of the invention, depending on the field of use.

Examples of suitable pH regulators are inorganic salts such as lithium hydroxide or lithium carbonate, quaternary ammonium hydroxide or ammonium carbonate. Examples of preservatives and antifoams are, for example, sodium dehydroacetate, 2,2-dimethyl-6-acetoxydioxane or ammonium thioglycolate. It is also possible to employ known agents which regulate the viscosity or the surface tension and are described in e.g. U.S. Pat. No. 5,085,698. Examples of water-miscible organic solvents are aliphatic $C_1$–$C_4$alcohols, such as methanol, ethanol, n-propanol, isopropanol, n-butanol, tert.-butanol. ketones such as acetone methyl ethyl ketone, methyl isobutyl ketone or diacetone alcohol, and also polyols, Cellosolves® and carbitols, such as ethylene glycol, diethylene glycol, triethylene glycol, glycerol, propylene gylcol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, and also N-methyl-2-pyrrolidone, 2-pyrrolidone, N,N'-dimethylformamide or N,N'-dimethylacetamide.

If desired, the ink prepared as described above can be worked up further. The working up of the ink can be carried out by the customary methods for working up dispersions, by separation techniques, such as sieving or centrifuging the coarse particles from the resulting dispersion. It has been found advantageous, too, to carry out centrifuging in two stages of different intensity, e.g. centrifuging in a first step for from ten minutes to one hour at from 2000 to 4000 rpm and then, in a second step, for from 10 minutes to one hour at from 6000 to 10000 rpm.

Following centrifuging or sieving, the dispersion usually can be used directly as an ink for ink jet printing, for example.

The present invention additionally relates to a process for producing color filters comprising a transparent substrate and applied thereon a red, blue and green layer in any desired sequence, by using a red compound I and known blue and green compounds. The different colored layers preferably exhibit patterns such that over at least 5% of their respective surface they do not overlap and with very particular preference do not overlap at all. The preparation and use of color filters or color-pigmented high molecular weight organic materials are well-known in the art and described e.g. in Displays 14/2, 1151 (1993), EP-A 784085, or GB-A 2,310,072.

The color filters can be coated for example using inks, especially printing inks, which can comprise pigment dispersions comprising the inventive DPPs I or can be prepared for example by mixing a pigment dispersion comprising a DPP I with chemically, thermally or photolytically structurable high molecular weight organic material (so-called resist). The subsequent preparation can be carried out, for example, in analogy to EP-A 654 711 by application to a substrate, such as a LCD, subsequent photostructuring and development.

Particular preference for the production of color filters is given to pigment dispersions comprising a DPP I which possess non-aqueous solvents or dispersion media for polymers.

The present invention relates, moreover, to toners comprising a pigment dispersion containing a DPP I or a high molecular weight organic material pigmented with a DPP I in a coloristically effective amount.

In a particular embodiment of the process of the invention, toners, coating materials, inks or colored plastics are prepared by processing masterbatches of toners, coating materials, inks or colored plastics in roll mills, mixing apparatus or grinding apparatus.

The present invention additionally relates to colorants, colored plastics, polymeric ink particles, or non-impact-printing material comprising an inventive DPP I pigment, preferably in the form of a dispersion, or a high molecular weight organic material pigmented with a DPP I in a coloristically effective amount.

A coloristically effective amount of the pigment dispersion according to this invention comprising an inventive DPP I denotes in general from 0.0001 to 99.99% by weight, preferably from 0.001 to 50% by weight and, with particular preference, from 0.01 to 50% by weight, based on the overall weight of the material pigmented therewith.

Further, the inventive compounds I can be used for textile application and for the dying of paper.

In contrast to known red fluorescent dyes (thioindigos) the inventive DPPs I can be applied to color polyamides, because they do not decompose during the incorporation into the polyamides. Further, they exhibit an exceptionally good lightfastness, a superior heat stability, especially in plastics.

EXAMPLES

The solid state absorbance spectra are measured on a Perkin-Elmer Lambda 9 UV/VIS-spectrometer and the solid state fluorescence spectra on a Perkin-Elmer MPF 66 with a 5 cm Ulbricht-sphere. The measurements are carried out with flexible PVC containing 0.02% by weight of the inventive compounds.

Example 1

Sodium hydride (60% dispersion in mineral oil, 2.56 g, 64 mmol) is added to a slurry of 1,4-diketo-3,6-bis-(4-dimethylaminophenyl)pyrrolo[3,4-c]pyrrole (obtained according to example 1 of EP-A 353,184) (6.0 g, 16.0 mmol) and tetraethyl ammonium bromide (0.344 g, 1.6 mmol) in 1-methyl-2-pyrrolidone (300 ml) at room temperature. After 2 hours, 1-dodecyliodide (19 g, 64 mmol) in 1-methyl-2-pyrrolidone (50 ml) is added over a 10-minutes period. The reaction mixture is then warmed up to 80° C. for 24 hours. After cooling to room temperature, water (300 ml) is added to the reaction mixture which is then warmed up to 80° C. for one hour. After cooling to 0° C., the supernatant liquid is decanted and the residual solid is crystallized from ethanol. The obtained crystals are washed with a small amount of first ethanol then n-hexane and thereafter dried in an atmosphere under reduced pressure at 50° C. for 24 hours. Yield: 7.08 g (62%) of a violet powder, exhibiting a red fluorescence in acetone, chloroform and dimethylsulfoxide ("DMSO").

Elemental analysis: C: 77.64% (calc. 77.70%), H: 9.93% (calc. 9.92%), N: 7.81% (calc. 7.88%)

Example 2

Example 1 is repeated except that 2,6-dichlorobenzyl bromide is used as alkylating agent. Yield: 58%, exhibiting a red fluorescence in acetone, chloroform and DMSO.

Elemental analysis: C: 61.97% (calc. 62.44%), H: 4.18% (calc. 4.37%), N: 8.08% (calc. 8.07%), Cl: 20.45% (calc. 20.48%)

Example 3

Example 1 is repeated except that 1-hexadecyl iodide is used as alkylating agent. Yield: 26%, exhibiting a red fluorescence in acetone, chloroform and DMSO.

Elemental analysis: C: 77.97% (calc. 78.78%), H: 10.90% (calc. 10.53%), N: 6.75% (calc. 6.81%).

Max. absorbance (solid state): 540 nm; max. fluorescence (solid state): 582 nm.

Example 4

Example 1 is repeated except that n-butyl iodide is used as alkylating agent. Yield: 33%, exhibiting a red fluorescence in acetone, chloroform and DMSO.

Elemental analysis: C: 74.03% (calc. 74.04%), H: 7.78% (calc. 7.87%), N: 11.53% (calc. 11.51%)

Max. absorbance (solid state): 543 nm; max. fluorescence (solid state): 587 nm; absorption (max) in toluene (aerated): 525 nm; fluorescence (max) in toluene (aerated): 525 nm; molar absorption coefficient (in toluene): 40408; quantum yield (in toluene): 0.41.

Example 5

Example 1 is repeated except that methyl iodide is used as alkylating agent. Yield: 54%, exhibiting a red fluorescence in acetone, chloroform and DMSO.

Elemental analysis: C: 71.63% (calc. 71.62%), H: 6.43% (calc. 6.51%), N: 13.53% (calc. 13.92%)

Example 6

Example 1 is repeated except that allyl bromide is used as alkylating agent. Yield: 58%, exhibiting a red fluorescence in acetone, chloroform and DMSO.

Elemental analysis: C: 72.90% (calc. 73.98%), H: 6.63% (calc. 6.65%), N: 12.16% (calc. 2.33%)

Example 7

Example 1 is repeated except that benzyl bromide is used as alkylating agent. Yield: 51%, exhibiting a red fluorescence in acetone, chloroform and DMSO.

Elemental analysis: C: 75.92% (calc. 77.95%), H: 6.24% (calc. 6.18%), N: 10.08% (calc. 10.10%)

Example 8

Example 5 is repeated except that 1,4-diketo-3,6-bis-(4-(4-morpholinyl)phenyl)pyrrolo[3,4-c]pyrrol (obtained according to example 4 of EP-A 353,184) is used. Yield: 64%, exhibiting a red fluorescence in acetone, chloroform and DMSO.

Elemental analysis: C: 68.93% (calc. 69.12%), H: 6.31% (calc. 6.21%), N: 11.28% (calc. 11.51%)

Example 9

Example 7 is repeated except that 1,4-diketo-3,6-bis-(4-(4-morpholinyl)phenyl)pyrrolo[3,4-c]pyrrol (obtained according to example 4 of EP-A 353,184) is. used. Yield: 19%, exhibiting a red fluorescence in acetone, chloroform and DMSO.

Elemental analysis: C: 74.59% (calc. 75.21%), H: 6.01% (calc. 6.00%), N: 8.60% (calc. 8.77%)

Example 10

(a) Triphenyl amine (98.32 g, 0.393 mol) is suspended in DMF (280 ml). Phosphorus oxychloride (66.24 g, 0.432 mol) is added dropwise to it over a 30-minutes period without external cooling. After stirring for one more hour, the reaction is heated to 80° C. (bath temperature) for 2 ½ hours. After cooling to room temperature, the reaction is slowly poured onto ice-cold water (8 liters) with vigorous stirring. After 30 minutes, aqueous sodium hydroxide (5 N, 250 ml) is added to the reaction, and stirring is continued for one hour. The obtained precipitate is filtered off, washed with water (2 liters), then with methanol (2 litres) and dried to give 4-diphenylaminobenzaldehyde as a beige solid (90.47 g, 0.331 mol, 84%), which is used in the next step without further purification.

(b) 48.7 g of the above obtained 4-diphenylaminobenzaldehyde (0.178 mol) is suspended in formic acid (400 ml). Hydroxylamine sulfate is added (16.08 g, 0.098 mol), followed by sodium formiate (14.15 g, 0.214 mol). The reaction is heated under reflux for 3 hours. Then the solvent is removed under vacuum. The residue is suspended in toluene (800 ml). The residual solid is filtered off and discarded. Solvents are evaporated and the residue is dissolved in a minimum amount of dichloromethane. This solution is filtered through a pad of silica gel, using dichloromethane as solvent. The solvent is then evaporated under vacuum. The thus obtained solid is taken up in toluene (350 ml) and heated to reflux in the presence of charcoal. After filtering hot, the solvent is removed from the filtrate to give 4-diphenyl-aminobenzonitrile (42.01 g, 0.155 mol, 87%) as a beige solid, which is taken to the next step without further purification.

(c) Sodium pieces (24.5 g, 1.064 mol) are added to tert.-amyl alcohol (400 ml). Then 20 mg of anhydrous $FeCl_3$ are added. The reaction mixture is slowly heated until a gentle reflux is obtained. After two hours, all sodium is reacted. 134.54 g of the above obtained 4-diphenylaminobenzonitrile (0.501 mol) are added in portions over a period of 15 minutes. Then di-tert.-butyl succinate (79.5 g, 0.346 mol) in tert.-amyl alcohol (300 ml) is added over 1.75 hours. After an additional hour of heating to reflux, the reaction mixture is cooled to room temperature and stirred overnight. Then, the reaction mixture is slowly added into a mixture of water (1200 ml) and methanol (600 ml) and stirred for 3 hours. The thus obtained solid is then filtered, washed with first water and then ethanol, and afterwards dried at 50° C. overnight. 70.96 g (0.114 mol, 46%) of 1,4-diketo-3,6-bis-(4-diphenylaminophenyl)-pyrrolo[3,4-c]pyrrole are obtained as a violet powder $^1$H-NMR (300 MHz, d$^6$-DMSO): 6.91 (d, 4 H, J=9 Hz); 7.15–7.22 (m, 12 H); 7.38–7.43 (m, 8 H); 8.32 (d, 4 H, J=9 Hz); 11.02 (broad s, 2 H).

(d) Example 5 is repeated except that the above obtained 1,4-diketo-3,6-bis-(4-diphenylaminophenyl)pyrrolo[3,4-c] pyrrol is used. Yield: 56%, exhibiting a red fluorescence in acetone, chloroform and DMSO.

Elemental analysis: C: 80.76% (calc. 81.21%), H: 5.30% (calc. 5.27%), N: 8.82% (calc. 8.61%), max. absorbance (solid state): 555 nm; max. fluorescence (solid state): 607 nm.

Example 11

Sodium hydride (60% dispersion in mineral oil, 47 g, 1.175 mol) is added portionwise over a 30-minutes period without external cooling and under nitrogen to a slurry of 1,4-diketo-3,6-bis-(4'-biphenyl)pyrrolo[3,4-c]pyrrole (140 g, 0.318 mol, obtained according to example 19 of U.S. Pat. No. 4,579,949) in 1-methyl-2-pyrrolidone (2 liters). After two hours the reaction mixture is cooled in an ice-water bath for 30 minutes, then benzyl bromide (216 g, 1.263 mol) is added dropwise (over 30 minutes). The reaction mixture is then slowly warmed-up to room temperature (by keeping the reaction flask in the cooling bath and allowing the ice in the bath to melt) and stirred at this temperature for 60 hours. Then acetic acid (50 ml), water (50 ml) and acetone (1.5 liters) are successively added. After stirring for 1 hour, a red solid is filtered off, washed with acetone (500 ml), water (4 liters), ethanol (1 liter), hexane (1 liter) and acetone (500 ml) and then dried under a reduced atmosphere at 50° C. for 24 hours. Yield: 129.50 g (66%) of bright red solid 1,4-diketo-2,5-dibenzyl-3,6-bis-(4'-biphenyl)pyrrolo[3,4-c]pyrrole.

Elemental analysis: C: 83.05% (calc. 85.14%), H: 5.36% (calc. 5.20%), N: 4.15% (calc. 4.51%), max. absorbance (solid state): 497 nm; max. fluorescence (solid state): 557 nm; absorption (max) in toluene (aerated): 492 nm; fluorescence (max) in toluene (aerated): 557 nm; molar absorption coefficient (in toluene): 27579; quantum yield (in toluene): 0.50.

Example 12

Example 11 is repeated, however, 2-naphthylmethyl bromide is used instead of benzyl bromide. Yield: 39% of red solid 1,4-diketo-2,5-di-2-naphthylmethyl-3,6-di-(4'-biphenyl)pyrrolo[3,4-c]pyrrole.

Example 13

(a) Example 11 is repeated, however, 1,4-diketo-3,6-di-(4'-chloro-phenyl)-pyrrolo[3,4-c]pyrrole is used instead of 1,4-diketo-3,6-bis-(4'-bi-phenyl)pyrrolo[3,4-c]pyrrole. Yield: 36% of bright orange solid of 1,4-diketo-2,5-dibenzyl-3,6-di-(4'-chlorophenyl)-pyrrolo[3,4-c]pyrrole.

(b) 13.44 g (0.025 mol) of the above obtained product, 4-methylthiophenol (6.46 g, 0.052 mol), and anhydrous potassium carbonate (7.20 g, 0.052 mol) are heated in DMF (300 ml) at 145° C. for five hours under an atmosphere of nitrogen. After cooling to room temperature, water (300 ml) is added and the mixture stirred for 30 min. The red-orange precipitate is filtered off, washed with water, then ethanol and finally dried under an atmosphere of reduced pressure at a temperature of 50° C. for 24 hours. Yield: 87% (15.47 g, 0.022 mol) of 1,4-diketo-2,5-dibenzyl-3,6-di-(4'-(4'-methylphenylthio)phenyl)-pyrrolo[3,4-c] pyrrole.

Elemental analysis: C: 77.27% (calc. 77.50%), H: 4.95% (calc. 5.09%), N: 4.16% (calc. 3.93%)

Example 14

(a) Example 11 is repeated, however, 1,4-diketo-3,6-di-(4'-chlorophenyl)-pyrrolo[3,4-c]pyrrole is used instead of 1,4-diketo-3,6-bis-(4'-bi-phenyl)pyrrolo[3,4-c]pyrrole and methyl iodide instead of benzyl bromide. Yield: 65% of dark orange solid of 1,4-diketo-2,5-dimethyl-3,6-di-(4'-chlorophenyl)pyrrolo[3,4-c]pyrrole.

(b) 16.05 g (0.042 mol) of the above obtained product, 4-methylthiophenol (6.46 g, 0.052 mol), and anhydrous potassium carbonate (11.98 9, 0.087 mol) are heated in DMF (200 ml) at 145° C. under an atmosphere of nitrogen for five hours. After cooling to room temperature, water (500 ml) is added and the mixture stirred for 60 min. The obtained solid is filtered off, washed with water, then ethanol and finally dried under an atmosphere of reduced pressure at a temperature of 50° C. overnight. Yield: 95% (22.28 g, 0.040 mol) of 1,4-diketo-2,5-dimethyl-3,6-di-(4'-(4"-methylphenylthio)phenyl)pyrrolo[3,4-c]pyrrole.

Max. absorbance (solid state): 502 nm; max. fluorescence (solid state): 558 nm.

Example 15

Sodium hydride (60% by weight in mineral oil, 1.05 g, 0.024 mol) is added portionwise to di-(4-chlorophenyl) diselenide (4.67 g, 0.012 mol) in DMF (60 ml) at room temperature under an atmosphere of nitrogen. The reaction mixture is then heated in an oil bath at 70° C. for one hour, then 1,4-diketo-2,5-dimethyl-3,6-di-(4'-chlorophenyl) pyrrolo[3,4-c]pyrrole (obtained according to example 14 (a)) (3.50 g, 0.010 mol) is added and the reaction mixture is heated to 130° C. for three hours. After cooling to room temperature, water (120 ml) is added and the reaction mixture is heated to 100° C. for 30 min. The obtained precipitate is filtered off, washed with water, then ethanol, and finally dried under an atmosphere of reduced pressure at a temperature of 50° C. for 24 hours. Yield: 72% (5.00 g, 0.0072 mol) of red solid 1,4-diketo-2,5-dimethyl-3,6-di-(4'-(4"-chlorophenylselenyl)phenyl)pyrrolo[3,4-c]pyrrole.

Elemental analysis: C: 53.76% (calc. 55.27%), H: 3.32% (calc. 3.19%), N: 4.24% (calc. 4.03%)

Example 16

Sodium hydride (60% by weight in mineral oil, 3.84 g, 0.088 mol) is added portionwise to di-(4-chlorophenyl) diselenide (16.76 g, 0.044 mol) in DMF (200 ml) at room temperature under an atmosphere of nitrogen. The reaction mixture is then heated in an oil bath at 70° C. for one hour, then 1,4-diketo-2,5-dibenzyl-3,6-di-(4'-chloro-phenyl) pyrrolo[3,4-c]pyrrole (obtained according to example 14 (a)) (21.5 g, 0.040 mol) is added and the reaction mixture is heated to 140° C. for five hours. After cooling to room temperature, water (500 ml) is added and the reaction mixture is heated to 100° C. for 30 min. The obtained solid is filtered off, washed with water, then ethanol, and finally dried under an atmosphere of reduced pressure at a temperature of 50° C. for 24 hours.

Yield: 96% (32.44 g, 0.038 mol) of dark red solid 1,4-diketo-2,5-dibenzyl-3,6-di-(4'-(4'-chlorophenylselenyl) phenyl)pyrrolo[3,4-c]pyrrole with a melting point in the range of from 248 to 250° C.

Example 17

(a) To a red suspension of 10.02 g (28 mmol) 1,4-diketo-3,6-di-(4'-chloro-phenyl)-pyrrolo[3,4-c]pyrrole (C.I. Pigment Red 254) and 9.28 g (67 mmol) of potassium carbonate in 230 ml DMA a solution of 6.39 g (84 mmol) 1-propanethiol in 30 ml DMA is added. Then the reaction mixture is heated to 130° C. and stirred at this temperature for 19.5 hours. Afterwards the reaction mixture is cooled to room temperature and poured into a 500 ml ice/water mixture. The obtained product is filtered, then washed first with 1.5 liter methanol and then with 1.5 liter water. Thereafter, the product is dried in an atmosphere under reduced pressure at a temperature of 70° C. Yield: 9.98 g (81.6%) of 1,4-diketo-3,6-di-(4'-(4"-n-propylphenylthio) phenyl)pyrrolo[3,4-c]pyrrole.

Elemental analysis: C: 66.17% (calc. 66.03%), H: 5.43% (calc. 5.54%), N: 6.66% (calc. 6.42%), S: 14.75% (calc. 14.69%)

(b) To a mixture of 4.80 g (0.120 mol) of sodium hydride (60% dispersion in mineral oil) in 350 ml 1-methyl-2-pyrrolidinone (dried over molecular sieves) 13.10 g (0.030 mol) of the under (a) obtained pigment are added under an atmosphere of nitrogen. The resulting mixture is stirred at room temperature for one hour after which 17.03 g (0.120 mol) of methyl iodide are added. The reaction mixture is allowed to proceed for 18 hours and then the mixture is poured into 800 ml of an ice/water mixture. The obtained product is filtered off and extracted with 500 ml of ethyl acetate. The ethyl acetate portion is concentrated and the concentrate is heated to reflux for two hours and then allowed to cool gradually to room temperature. The obtained crystals are collected by filtration, washed with a small amount of ethyl acetate and then dried at 60° C. under an atmosphere of reduced pressure. 5.61 g (40.2%) of red solid 1,4-diketo-2,5-dimethyl-3,6-di-(4'-(4"-n-propylphenylthio)-phenyl)-pyrrolo[3,4-c]pyrrole are obtained.

Elemental analysis: C: 67.15% (calc. 67.21%), H: 6.24% (calc. 6.07%), N: 5.92% (calc. 6.03%), S: 13.50% (calc. 13.80%) Max. absorbance (solid state): 510 nm; max. fluorescence (solid state): 572 nm.

(c) 1.0 g of the pigment prepared according to Example 17 (b) is mixed with 63.0 g of polyvinyl chloride (for making flexible PVC sheets; PVC Evipol SH 7020 from EVC GmbH, D-Frankfurt a.M.; white powder, odorless; density at 20° C.: ca. 1,4 g/cm$^3$), 3.0 g of diisodecylphthalat (Palatinol Z ("epoxidized soya oil") from Hugo Häffner GmbH & Co. KG, D-71679 Asperg; colorless liquid; boiling point: 250–267° C. (at a pressure of 700 Pa (7 mbar)), 2.0 g of a thermal stabilizer (IRGASTAB BZ 561 from Ciba Specialty Chemicals; comprising 35 to 45% by weight organic barium compounds (CAS-No. 10196-68-6&68515-89-9), 20 to 30% by weight alkyl-arylphosphite (CAS-No. 101-02-0 and 1254-78-0), <5% by weight mixture of hydrocarbons (CAS-No. 64742-95-6), and <3% by weight Zn-p-nonylphenolate (CAS-No. 74230-03-8); yellow liquid; viscosity: 200–450 mPa (20° C.)), and 32.0 g of dioctyl phthalate, and the mixture is processed on a roller mill at 160° C. for eight minutes to give a thin sheet. The PVC sheet thus produced is distinguished by its very strong fluorescent orange color.

Example 18

(a) To a well-stirred suspension of 41.27 g (0.3 mol) of 4-chlorobenzonitrile, 58.05 g (0.42 mol) of potassium carbonate and 200 ml DMA a solution of 27.06 g (0.3 mol) of 1-butanethiol in 50 ml of DMA are added under an atmosphere of nitrogen. The resulting mixture is heated to 80° C. and stirred at this temperature for 24 hours. Then, the reaction mixture is cooled to room temperature and poured into 750 ml of water. The crude product is extracted with 300 ml of ethyl acetate, washed with water, dried over MgSO$_4$. Thereafter, ethyl acetate is removed. Then, fractional distillation yields 52.88 9 (80.4%) of colorless liquid 4-n-butylthio-benzonitrile.

Elemental analysis: C: 69.12% (calc. 69.07%), H: 6.99% (calc. 6.85%), N: 7.50% (calc. 7.32%), S: 16.62% (calc. 16.76%)

(b) A mixture of 9.48 g (0.41 mol) of sodium in 520ml of tert.-amyl alcohol is heated to reflux (102° C.) and stirred at this temperature for 16 hours. The sodium tert.-amylate solution thus obtained is cooled to 90° C. Then 52.6 g (0.275 mol) of 4-butylthio-benzonitrile (from example 18a) is added. The mixture is then heated to reflux. To this well-stirred mixture 27.8 9 (0.138 mol) di-isopropyl succinate is added dropwise over a period of three hours. The resulting reaction mixture is stirred under a nitrogen atmosphere at a temperature of 102° C. for 19 hours. It is cooled to room temperature and added into a mixture of 500 ml of water and 500 ml of methanol. The obtained solid product is filtered, washed with 1.5 liters of methanol followed by 2 liters of water and dried at 70° C. in an atmosphere of reduced pressure. Yield: 32.89 g (51.5%) of dark red 1,4-diketo-3,6-di-(4'-n-butylthiophenyl)pyrrolo[3,4-c]pyrrole.

Elemental analysis: C: 66.96% (calc. 67.21%), H: 6.15% (calc. 6.07%), N: 5.97% (calc. 6.03%), S: 13.00% (calc. 13.80%)

(c) To a mixture of 4.80 g (0.120 mol) of sodium hydride (60% dispersion in mineral oil) in 350 ml 1-methyl-2-pyrrolidinone (dried over molecular sieves) 13.94 g (0.030 mol) of the product obtained in example 18(b) are added in portions over a period of two hour under an atmosphere of nitrogen. The resulting mixture is stirred at room temperature for one hour during which a violet colored solution is obtained. To this well stirred solution 17.03 g (0.120 mol) methyl iodide are added dropwise. The reaction is allowed to proceed for 20 hours and then the mixture is poured into 800 ml of an ice/water mixture. The crude product is filtered off and then treated with 50 ml of ethyl acetate under reflux conditions. After cooling, the obtained crystals are filtered, washed with a small amount of ethyl acetate and dried at 50° C. under an atmosphere of reduced pressure. Yield: 7.94 g (53.7%) of red solid 1,4-diketo-2,5-dimethyl-3,6-di-(4'-n-butylthiophenyl)pyrrolo[3,4-c]pyrrole.

Elemental analysis: C: 68.16% (calc. 68.26%), H: 6.60% (calc. 6.55%), N: 5.58% (calc. 5.69%), S: 12.88% (calc. 13.01%) Max. absorbance (solid state): 515 nm; max. fluorescence (solid state): 572 nm.

(d) Example 16(c) is repeated except that the pigment obtained in example 18(c) is used. The PVC sheet exhibits a very strong fluorescent orange color.

Example 19

(a) To a solution of 9.96 g of 4'-hydroxy-4-biphenylcarbonitrile in 250 ml ethanol (heated to a temperature of 50° C.) an aqueous solution of sodium hydroxide (2.24 g in 20 ml water) is added, followed by the dropwise addition (within 10 minutes) of 21.05 g of 1-bromo-hexane. The resulting yellow coloured suspension is stirred at a temperature of 60° C. for 23 hours. Then it is concentrated and thereafter cooled with the use of an ice bath. The precipitate is filtered, washed with cold ethanol and dried at 30° C. under an atmosphere of reduced pressure. Yield: 10.47 g (73.4%) of white crystalline 4'-n-hexoxy-4-biphenyl-carbonitrile.

Elemental analysis: C: 81.73% (calc. 81.68%), H: 7.64% (calc. 7.58%), N: 4.90% (calc. 5.01%)

(b) Under nitrogen atmosphere 10.06 g of the above obtained 4'-n-hexoxy-4-biphenyl-carbonitrile are added to a sodium tert.-amyl alcohol solution (prepared from 2.48 g sodium and 70 ml tert.-amyl alcohol) heated to 100° C., followed by the dropwise addition of 3.64 g of diisopropyl succinate. The reaction mixture is stirred for 21.5 hours under reflux conditions and then cooled to room temperature. It is then added to a mixture of 75 ml of methanol, 6.5 g of acetic acid and 75 ml of water. The obtained pigment is filtered, washed with methanol, then with water, and dried at 60° C. under an atmosphere of reduced pressure. Yield: 6.60 g (57.2%) of 1,4-diketo-3,6-di-(4'-n-hexoxy-4-biphenyl)pyrrolo[3,4-c]pyrrole.

Elemental analysis: C: 78.30% (calc. 78.72%), H: 7.16% (calc. 6.92%), N: 4.87% (calc. 4.37%)

(c) To a mixture of 1.60 g of sodium hydride (60% dispersion in mineral oil) in 150 ml 1-methyl-2-pyrrolidinone (dried over molecular sieves) 6.41 g of the pigment obtained in ex. 20(b) is added in portions over a period of 1 hour under a nitrogen atmosphere. The resulting mixture is stirred at room temperature for one hour during which a dark colored suspension is obtained. To this well stirred suspension 5.68 g of methyl iodide are added dropwise. The reaction is allowed to proceed for 20 hours and then the mixture is poured into 400 ml of an ice/water mixture. The crude product is filtered off and treated with 50 ml of ethyl acetate under reflux conditions. After cooling, the obtained crystals are filtered, rinsed with a small amount of ethyl acetate and dried at 50° C. in an atmosphere of reduced pressure. Yield: 3.51 g (52.5%) of red solid 1,4-diketo-2,5-dimethyl-3,6-di-(4'-n-hexoxy-4-biphenyl)pyrrolo[3,4-c]pyrrole.

Elemental analysis: C: 77.69% (calc. 79.01%), H: 7.41% (calc. 7.23%), N: 4.14% (calc. 4.19%) Max. absorbance (solid state): 510 nm; max. fluorescence (solid state): 578 nm.

(d) Example 17(c) is repeated except that the pigment obtained in example 19(c) is used. The PVC sheet exhibits a very strong fluorescent orange-red color.

Example 20

2.09 g (4.75 mmol) 1,4-diketo-3,6-bis-(4-biphenyl)-pyrrolo-(3,4-c)-pyrrole are slurred in 30 ml of 1-methyl-2-pyrrrolidinone for 2 hours at room temperature. 1.29 g (11.52 mmol) of potassium tert.-butoxide is added to the slurry under nitrogen. After stirring for 2 hours, 2.05 g (11.1 mmol) of 3-methylbenzyl bromide is added to the reaction mixture and then the mixture is stirred additionally for 2 hours. The mixture is poured into 50 ml of water and the red solid is filtered off and purified by column chromatography (silica gel, dichloromethane as eluent). After drying, 1.89 g (61%) of a red solid are obtained.

Example 21

Example 20 is repeated except that 3,5-dimethylbenzyl bromide is used as alkylating agent. Red solid (yield: 24%).

Example 22

Example 20 is repeated except that 4-methyl benzylbromide is used as alkylating agent. Red solid (yield: 62%).

Example 23

(a) 24.6 g of potassium t-butoxide, 30 g of 2- naphthonitrile and 200 ml of tert.-amyl alcohol are heated up to 100° C. under a nitrogen atmosphere. As soon as the this temperature is reached, a solution of 23 g of di-n-butyl succinate and 70 ml of tert.-amyl alcohol is added over one hour using a dropping funnel. When the addition is complete, the, reaction mixture is kept for 16 hours at 100° C., then it is cooled to 65° C., afterwards neutralized with 20 ml of glacial acetic acid and boiled briefly under reflux. The resultant pigment suspension is filtered at room temperature. The obtained filter cake is suspended in 300 ml of methanol and the pigment is isolated by filtration, then finally washed with methanol and water until washings run colorless, thereafter dried at 100° C. in vacuo. Affording 26.1 g (69%, based on dibutyl succinate) of pure 1,4-diketo-3,6-bis-(2-naphthyl)-pyrrolo-(3,4-c)-pyrrole.

(b) Example 21 is repeated except that 1,4-diketo-3,6-bis-(2-naphthyl)-pyrrolo-(3,4-c)-pyrrole is used as starting material. Red solid (yield: 36%).

Example 24

Example 23 is repeated except that benzyl bromide is used as alkylating agent. Orange solid (yield: 30%).

Example 25

Example 23 is repeated except that 2-methylbenzyl bromide is used as alkylating agent. Orange solid (yield: 30%).

Example 26

Example 23 is repeated except that 2-phenylbenzyl bromide is used as alkylating agent. Red solid (yield: 8%).

Example 27

Example 20 is repeated except that 4-phenylbenzyl bromide is used as alkylating agent. Red solid (yield: 50%).

Example 28

2.0 g (4.54 mmol) 1,4-diketo-3,6-bis-(4-biphenyl)-pyrrolo-(3,4-c)-pyrrole are slurred in 30 ml of 1-methyl-2-pyrrolidinone for two hours at room temperature. 1.3 g (11.61 mmol) of potassium tert.-butoxide are added to the slurry under nitrogen. After stirring for two hours, 2.07 g (11.2 mmol) of 2-methylbenzyl bromide are added to the reaction mixture and then the mixture is stirred additionally for two hours. The mixture is poured into 50 ml of water and the red solid is filtered off and purified by column chromatography (silica gel, dichloromethane as eluent). After drying, 0.866 g (29%) of a red solid are obtained.

Example 29

Example 28 is repeated except that 3-phenylbenzyl bromide is used as alkylating agent. Red solid (yield: 38%).

Example 30

Example 28 is repeated except that 3-methylbenzyl bromide and 1,4-diketo-3,6-bis-(2-naphthyl)-pyrrolo-(3,4-c)-pyrrole are used as alkylating agent and starting material, respectively. Red solid (yield: 30%).

Example 31

Example 30 is repeated except that 4-methylbnzyl bromide is used as alkylating agent. Red solid (yield: 36%).

Example 32

Example 30 is repeated except that 4-phenylbenzyl bromide is used as alkylating agent. Orange solid (yield: 30%).

Example 33

2.2 g (5.0 mmol) 1,4-diketo-3,6-bis-(4-biphenyl)-pyrrolo-(3,4-c)-pyrrole are slurred in 20 ml of 1-methyl-2-pyrrolidinone for two hours at room temperature. 1.46 g (13.0 mmol) of potassium tert.-butoxide are added to the above obtained slurry under nitrogen. After stirring for two hours, 2.78 g (12 mmol) of 2-iodoethyl benzene are added to the reaction mixture. Then, the mixture is heated up to 80° C. and stirred additionally for three hours. After cooling to room temperature, the mixture is poured into 50 ml of water and the obtained red solid is filtered off and purified by column chromatography (silica gel, dichloromethane as eluent). After drying, 0.16 g (5%) of a red solid are obtained.

Example 34

Example 33 is repeated except that 1,4-diketo-3,6-bis-(2-naphthyl)-pyrrolo-(3,4-c)-pyrrole is used as starting material (yield: 29%).

Example 35

Example 23 is repeated except that 3-phenylbenzyl bromide is used as alkylating agent. Orange solid (yield: 35%)

Example 36

Example 23 is repeated except that 3-methylbenzyl bromide is used as alkylating agent. Orange solid (yield: 30%).

Example 37

2.2 g (5.0 mmol) 1,4-diketo-3,6-bis-(4-biphenyl)-pyrrolo-(3,4-c)-pyrrole are slurred in 20 ml of 1-methyl-2-pyrrrolidinone for two hours at room temperature. 1.46 g (13.0 mmol) of potassium tert.-butoxide are added to the slurry under nitrogen. After stirring for two hours, 2.53 g (13 mmol) of neopentyl iodide are added to the reaction mixture. The mixture is heated up to 120° C. and stirred additionally for 12 hours. After cooling to room temperature, the mixture is poured into 50 ml of water and a red solid is filtered off and purified by column chromatography (silica gel, dichloromethane as eluent). After drying, 0.13 g (4%) of an orange solid are obtained.

Example 38

To the below mentioned engineering plastics (each 400 g) in chip form the inventive compounds (each 0.12 g) are added in a paint shaker and shaken there for 90 seconds. Thereafter, the thus obtained chips comprising the adhered inventive compounds are molded at the temperatures specified in Table 1 below using a BA400 Battenfeld injection molder.

TABLE 1

| Engineering plastic | Temperature settings (° C.) | | |
| --- | --- | --- | --- |
| | Nozzle | Middle | Rear |
| HIPS | 232 (450° F.) | 232 (450° F.) | 232 (450° F.) |
| ABS | 232 (450° F.) | 232 (450° F.) | 232 (450° F.) |
| Nylon 6, 12 | 271 (520° F.) | 260 (500° F.) | 254 (490° F.) |
| PMMA | 226 (440° F.) | 226 (440° F.) | 226 (440° F.) |

HIPS: high impact polystyrene (825P1 from Fina Oil and Chemical; melt flow (g/10 min): 8 (reference ASTM TEST 200/5.0 D-1238))

ABS: acrylic-butadiene-styrene copolymer (Natural ABS 3501-002 from Diamond Polymer; melt flow (g/10 min): 7.5 (reference ASTM Method D-1238))

Nylon 6,12 : polyamide (ZYTEL®158L from DuPont Engineering Polymers; inherent viscosity: 1.15))

PMMA: polymethylmethacrylate (PLEXIGLAS®V825 from Atohaas; melt flow (g/10 min): 3.7 (reference ASTM Method D-1238))

Five chips (from the same series) obtained from the injection molder are collected after the color is distributed homogeneously.

The color chips are then mounted, with the thickest part of the chip exposed (0.31 cm (0.122 inches)), in a Cl35A Atlas Xenon Weather-O-Meter. The parameters of the weather-o-meter are listed in Table 2.

The color chips are then exposed to the weather-o-meter for 100, 250, 500, 750, and 1000 hours. The color chips are rated after each fading interval is reached. The lightfastness is subjectively evaluated using a gray scale rating of 1–5. A rating of 5 indicates no fade or color difference. In cases where the color chip appears to darken a rating of d for darkening is applied to the gray scale rating. In cases where the color chip loses most of its color a rating of f for fading is applied to the gray scale rating.

TABLE 2

Parameters for the fading test

| Automatic voltage 0.35 W/m² at 340 nm | Light Cycle Settings Temperature [° C.] |
|---|---|
| Black Panel[1] | 63 |
| Wet Bulb Depression[2] | 10 |
| Conditioning Water[3] | 30 | automatic voltage: controls irradiance level (similar to the average irradiance found on a clear summer day in southern Florida)

1) temperature is measured by a sensor attached to the specimen holder, provides a temperature reading resulting from the chamber air and any heating due to the xenon light
2) difference between air temperature (measured by the so-called dry bulb sensor) and wet bulb temperature (measured by wet bulb sensor, whereby the wet bulb is covered by a moistened wick; due to the cooling effect of evaporation, the wet bulb reading is usually lower than the dry bulb reading (except at 100% relative humidity).

RESULTS

TABLE 3

Nylon evaluation

| used DPP of | Lightfastness evaluation using the gray scale | | | | |
|---|---|---|---|---|---|
| example no. | 100 h | 250 h | 500 h | 700 h | 1000 h |
| 5 | 4/5 | 4/5d | 3/4d | 3/4d | 3/4d |
| 7 | 4/5 | 4/5d | 4f | 3/4f | 2/3f |
| 4 | 4/5 | 4d | 3/4d | 3/4d | 3/4d |

(gray scale assesses color differences after exposure to light, from 1 to 5, wherein 5 means n color)

By comparison, the commercial thioindigo Vat Red 41 (Hostasol®Red 5B from Clariant) decomposed in nylon, i.e. no color is found in the produced nylon chips.

TABLE 4

PMMA evaluation

| Used DPP of | Lightfastness evaluation using the gray scale | | | | |
|---|---|---|---|---|---|
| example no. | 100 h | 250 h | 500 h | 700 h | 1000 h |
| 4 | 5 | 5 | 4/5 | 4/5 | 4/5 |
| 5 | 5 | 5 | 4/5 | 4/5 | 4/5 |
| 7 | 5 | 5 | 4/5 | 4/5 | 4/5 |
| 11 | 5 | 4/5 | 4/5 | 4/5 | 4/5 |
| 13b | 5 | 4/5 | 4/5 | 4/5 | 4/5 |
| 15 | 5 | 4d | 4 | 3 | 3f |
| Vat Red 41 | 3f | 2f | 1f at 322 h | | |

TABLE 5

ABS evaluation

| Used DPP of | Lightfastness evaluation using the gray scale | | | | |
|---|---|---|---|---|---|
| example no. | 100 h | 250 h | 500 h | 700 h | 1000 h |
| 4 | 4/5 | 4/5 | 4/5d | 4d | 4d |
| 5 | 4 | 4 | 4d | 4d | 4d |
| 7 | 4 | 4d | 4d | 4d | 4d |
| 11 | 4/5 | 4/5 | 4/5d | 4/5d | 4d |
| 13b | 4/5 | 4/5 | 4/5d | 4/5d | 4d |
| 15 | 4/5 | 3/4d | 3/4d | 3d | 3d |
| Vat Red 41 | 3 | 2 | 1f at 322 h | | |

TABLE 6

HIPS evaluation

| used DPP of | Lightfastness evaluation using the gray scale | | | | |
|---|---|---|---|---|---|
| example no. | 100 h | 250 h | 500 h | 700 h | 1000 h |
| 4 | 4/5 | 4 | 4 | 4d | 3d |
| 5 | 4 | 4 | 3/4 | 3d | 2/3d |
| 7 | 4 | 4 | 3/4 | 3d | 2/3d |
| 10d | 4/5 | 4 | 4d | 3d | 3d |
| 11 | 4/5 | 4/5 | 4 | 4 | 3/4d |
| 13b | 4/5 | 4/5 | 4/5d | 4d | 3/4d |
| 15 | 4/5 | 3/4d | 3/4d | 3d | 3d |
| Vat Red 41 | 3 | 2/3 | 1f | | |

Example 39

2.09 g (4.75 mmol) 1,4-diketo-3,6-bis-(4-biphenyl)-pyrrolo-(3,4-c)-pyrrole are slurried in 30 ml of 1-methyl-2-pyrrolidinone for 2 hours at room temperature. 1.29 g (11.52) of potassium tert.-butoxide are added to the slurry under an atmosphere of nitrogen. After stirring for 1 h, 1.21 g (10 mmol) of allyl bromide are added to the reaction mixture, and then the mixture is stirred for another 2 hours. The mixture is then poured into 50 ml of water and the red solid is filtered off and purified by column chromatography (silica gel, dichloromethane as eluent). After drying, 1.13 g (60%) of a red solid are obtained.

Example 40

Example 39 is repeated except that 1,4-diketo-3,6-bis-(4-methylphenyl)-pyrrolo-(3,4-c)-pyrrole is used as starting material. A red solid (54%) is obtained.

Example 41

Example 39 is repeated except that 3,3-dimethylallylbromide is used instead of allyl bromide. A red solid (42%) is obtained.

Example 42

Example 39 is repeated except that 3-phenylallylbromide is used instead of allyl bromide. A red solid (55%) is obtained.

Example 43

A mixture of 45 g (0.4 mol) of potassium tert.-butoxide, 82 g (0.373 mol) of 9-ethyl-3-cyanocarbazole and 300 ml of tert.-amyl alcohol is heated up to 100° C. under a nitrogen atmosphere. As soon as the temperature is reached, a solution of 43 g (0.18 mol) of di-n-butyl succinate and 100 ml of tert.-amyl alcohol are added during 1.5 hours using a dropping funnel. When the addition is complete, the reaction mixture is kept for 16 hours at 110° C., then cooled to 65° C., neutralized with 40 ml of glacial acetic acid and boiled briefly to reflux temperature. The resultant pigment suspension is filtered at room temperature. The filter cake is suspended in 300 ml of methanol and the pigment is isolated by filtration, then finally washed with methanol and water until washings run colorless, then dried at 100° C. under an atmosphere of reduced pressure. 10.5 g (11%) of pure 1,4-diketo-3,6-bis-(3-(9-ethylcarbazole))-pyrrolo-(3,4-c)-pyrrole are obtained.

Example 44

Example 39 is repeated except that 1,4-diketo-3,6-bis-(2-naphthyl)-pyrrolo-(3,4-c)pyrrole and 3,5-di-tert.-butylbenzylbromide are used. A red solid (36%) is obtained.

Example 45

Example 44 is repeated except that 3,5-dimethylbenzyl bromide is used instead of 3,5-di-tert.-butylbenzylbromide. A red solid (30%) is obtained.

Example 46

Example 45 is repeated except that 1-(4-cyanophenyl)-2-(3,5-di-tert.-butylphenyl)-trans-ethylene is used instead of 9-ethyl-3-cyanocarbazole. A red solid (5%) is obtained.

Example 47

Example 46 is repeated except that 3,5-dimethylbenzyl bromide is used as alkylating agent. A red solid (8%) is obtained.

What is claimed is:
1. Fluorescent diketopyrrolopyrroles ("DPPs") of the formula I

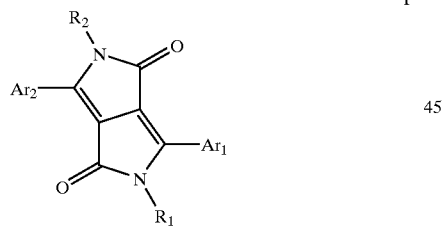

wherein $R_1$ and $R_2$, independently from each other, stand for $C_1$–$C_{25}$-alkyl, allyl which can be substituted one to three times with $C_1$–$C_3$alkyl or $Ar_3$, —$CR_3R_4$—$(CH_2)_m$—$Ar_3$, wherein $R_3$ and $R_4$ independently from each other stand for hydrogen or $C_1$–$C_4$alkyl, or phenyl which can be substituted one to three times with $C_1$–$C_3$ alkyl, $Ar_3$ stands for phenyl or 1- or 2-naphthyl which can be substituted one to three times with $C_1$–$C_8$alkyl, $C_1$–$C_8$alkoxy, halogen or phenyl, which can be substituted with $C_1$–$C_8$alkyl or $C_1$–$C_8$alkoxy one to three times, and m stands for 0, 1, 2, 3 or 4, and wherein $C_1$–$C_{25}$-alkyl or —$CR_3R_4$—$(CH_2)_m$—$Ar_3$, can be substituted with a functional group capable of increasing the solubility in water which are selected from the group consisting of a tertiary amino group, —$SO_3$, or $PO_4^{2-}$, $Ar_1$ and $Ar_2$, independently from each other, stand for

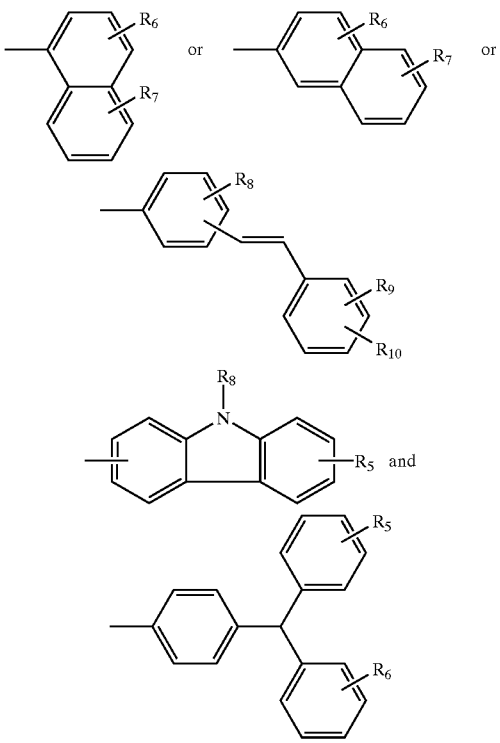

wherein
$R_5$ stands for $C_1$–$C_6$alkyl, —$NR_8R_9$, —$OR_{10}$, —$S(O)_nR_8$, —$Se(O)_nR_8$, or phenyl, which can be substituted one to three times with $C_1$–$C_8$alkyl or $C_1$–$C_8$alkoxy, wherein $R_8$ and $R_9$, independently from each other, stand for hydrogen, $C_1$–$C_{25}$-alkyl, $C_5$–$C_{12}$-cycloalkyl, —$CR_3R_4$—$(CH_2)_m$—Ph, $R_{10}$, wherein $R_{10}$ stands for $C_6$–$C_{24}$-aryl, or a saturated or unsaturated heterocyclic radical having five to seven ring atoms, wherein the ring consists of carbon atoms and one to three hetero atoms selected from the group consisting of nitrogen, oxygen and sulfur, wherein Ph, the aryl and heterocyclic radical can be substituted one to three times with $C_1$–$C_8$alkyl, $C_1$–$C_8$alkoxy, or halogen, or $R_8$ and $R_9$ stand for —$C(O)R_{11}$, wherein $R_{11}$, can be $C_1$–$C_{25}$-alkyl, $C_5$–$C_{12}$-cycloalkyl, $R_{10}$, —$OR_{12}$ or —$NR_{13}R_{14}$, wherein $R_{12}$, $R_{13}$, and $R_{14}$ stand for $C_1$–$C_{25}$-alkyl, $C_5$–$C_{12}$-cycloalkyl, $C_6$–$C_{24}$-aryl, or a saturated or unsaturated heterocyclic radical comprising five to seven ring atoms, wherein the ring consists of carbon atoms and one to three hetero atoms selected from the group consisting of nitrogen, oxygen and sulfur, wherein the aryl and heterocyclic radical can be substituted one to three times with $C_1$–$C_8$alkyl or $C_1$–$C_8$alkoxy, or —$NR_8R_9$ stands for a five- or six-membered heterocyclic radical in which $R_8$ and $R_9$ together stand for tetramethylene, pentamethylene, —$CH_2$—$CH_2$—O—$CH_2$—$CH_2$—, or —$CH_2$—$CH_2$—$NR_5$—$CH_2$—$CH_2$—, and n stands for 0, 1, 2 or 3, and wherein $R_6$ and $R_7$, independently from each other, stand for hydrogen or $R_5$, but do not stand simultaneously for hydrogen.

2. Fluorescent diketopyrrolopyrroles ("DPPs") of the formula I

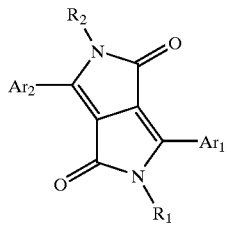

wherein $R_1$ and $R_2$, independently from each other, stand for $C_1$–$C_{25}$-alkyl, allyl which can be substituted one to three times with $C_1$–$C_3$alkyl or $Ar_3$, —$CR_3R_4$—$(CH_2)_m$—$Ar_3$, wherein $R_3$ and $R_4$ independently from each other stand for hydrogen or $C_1$–$C_4$alkyl, or phenyl which can be substituted one to three times with $C_1$–$C_3$ alkyl, $Ar_3$ stands for phenyl or 1- or 2-naphthyl which can be substituted one to three times with $C_1$–$C_8$alkyl, $C_1$–$C_8$alkoxy, halogen or phenyl, which can be substituted with $C_1$–$C_8$alkyl or $C_1$–$C_8$alkoxy one to three times, and m stands for 0, 1, 2, 3 or 4, and wherein $C_1$–$C_{25}$-alkyl or —$CR_3R_4$—$(CH_2)_m$—$Ar_3$, can be substituted with a functional group capable of increasing the solubility in water which are selected form the group consisting of a tertiary amino group, —$SO_3$, or $PO_4^{2-}$, $Ar_1$ and $Ar_2$, independently from each other, stand for

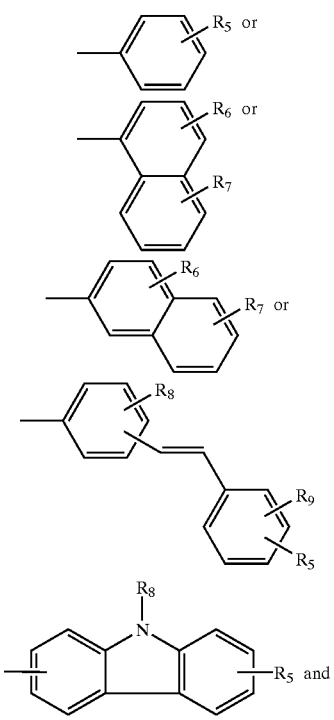

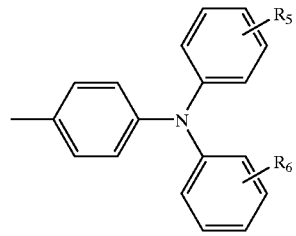

wherein
$R_5$ stands for $C_1$–$C_6$alkyl, —$NR_8R_9$, —$OR_{10}$, —$S(O)_nR_8$, —$Se(O)_nR_8$, or phenyl, which can be substituted one to three times with $C_1$–$C_8$alkyl or $C_1$–$C_8$alkoxy, wherein $R_8$ and $R_9$, independently from each other, stand for hydrogen, $C_1$–$C_{25}$-alkyl, $C_5$–$C_{12}$-cycloalkyl, —$CR_3R_4$—$(CH_2)_m$—Ph, $R_{10}$, wherein $R_{10}$ stands for $C_6$–$C_{24}$-aryl, or a saturated or unsaturated heterocyclic radical having five to seven ring atoms, wherein the ring consists of carbon atoms and one to three hetero atoms selected from the group consisting of nitrogen, oxygen and sulfur, wherein Ph, the aryl and heterocyclic radical can be substituted one to three times with $C_1$–$C_8$alkyl, $C_1$–$C_8$alkoxy, or halogen, or $R_8$ and $R_9$ stand for —$C(O)R_{11}$, wherein $R_{11}$, can be $C_1$–$C_{25}$-alkyl, $C_5$–$C_{12}$-cycloalkyl, $R_{10}$, —$OR_{12}$ or —$NR_{13}R_{14}$, wherein $R_{12}$, $R_{13}$, and $R_{14}$ stand for $C_1$–$C_{25}$-alkyl, $C_5$–$C_{12}$-cycloalkyl, $C_6$–$C_{24}$-aryl, or a saturated or unsaturated heterocyclic radical comprising five to seven ring atoms, wherein the ring consists of carbon atoms and one to three hetero atoms selected from the group consisting of nitrogen, oxygen and sulfur, wherein the aryl and heterocyclic radical can be substituted one to three times with $C_1$–$C_8$alkyl or $C_1$–$C_8$alkoxy, or —$NR_8R_9$ stands for a five- or six-membered heterocyclic radical in which $R_8$ and $R_9$ together stand for tetramethylene, pentamethylene, —$CH_2CH_2$—O—$CH_2$—$CH_2$—, or —$CH_2$—$CH_2$—$NR_5$—$CH_2$—$CH_2$—, and n stands for 0, 1, 2 or 3, and wherein $R_6$ and $R_7$, independently from each other, stand for hydrogen or $R_5$, but do not stand simultaneously for hydrogen, with the proviso that $Ar_1$ and $Ar_2$ are not a group of the formula

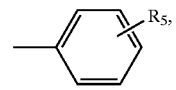

wherein $R_5$ is $C_1$–$C_6$-alkyl.

3. A method of coloring high molecular weight organic materials comprising incorporating a compound according to claim 1 into said high molecular weight organic material.

4. A fluorescent diketopyrrolopyrrole according to claim 1 wherein $R_8$ and $R_9$ together stand for —$CH_2$—$CH_2$—O—$CH_2$—$CH_2$—.

5. A fluorescent diketopyrrolopyrrole according to claim 1 wherein $R_6$ stands for $R_5$ and $R_7$ for hydrogen.

* * * * *

UNITED STATES PATENT AND TRADEMARK OFFICE
CERTIFICATE OF CORRECTION

PATENT NO.    : 6,603,020 B1
DATED         : August 5, 2003
INVENTOR(S)   : Moretti Robert et al.

It is certified that error appears in the above-identified patent and that said Letters Patent is hereby corrected as shown below:

Column 30,
Lines 23-30, should read:

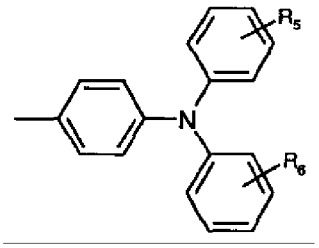

Signed and Sealed this

Twenty-second Day of March, 2005

JON W. DUDAS
*Director of the United States Patent and Trademark Office*